UNITED STATES PATENT OFFICE.

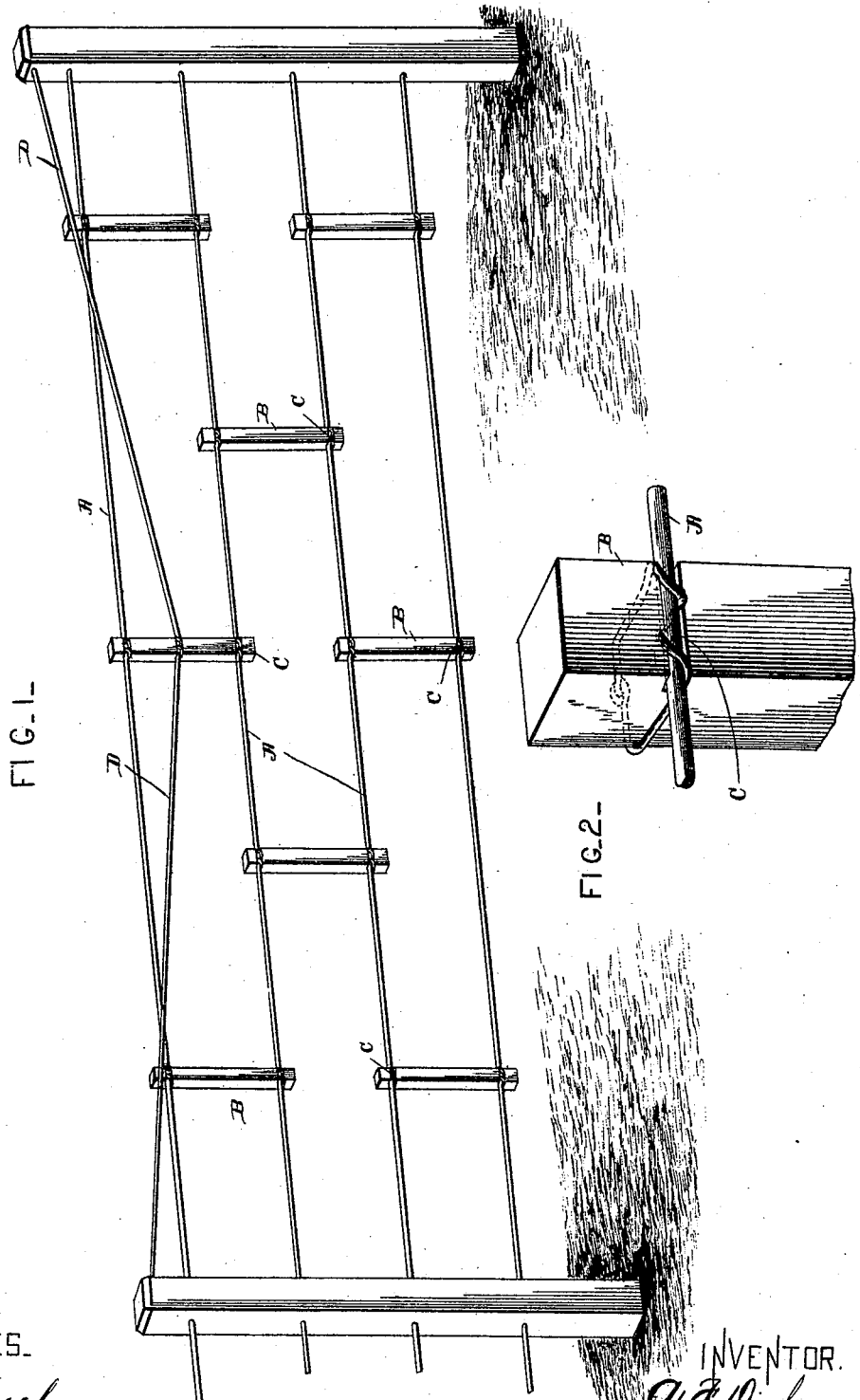

AARON F. DICKEY, OF FRIEDENS, PENNSYLVANIA.

WIRE FENCE.

SPECIFICATION forming part of Letters Patent No. 463,446, dated November 17, 1891.

Application filed April 4, 1891. Serial No. 387,688. (No model.)

*To all whom it may concern:*

Be it known that I, AARON F. DICKEY, of Friedens, in the county of Somerset and State of Pennsylvania, have invented certain new and useful Improvements in Wire Fences; and I do hereby declare the following to be a full, clear, and exact description of the invention, such as will enable others skilled in the art to which it pertains to make and use it, reference being had to the accompanying drawings, which form part of this specification.

My invention relates to an improvement in wire fences; and it consists in the particular construction of parts, which will be fully described hereinafter, and referred to in the claim.

The object of my invention is to attach to the main wires of the fence short pickets which serve not only to attract the attention of the animals to the fence, and thus prevent them from being injured by the barbs upon the wires, but to strenghten and brace the wires and make a stronger, better, and more ornamental fence.

Figure 1 is perspective of a portion of a fence which embodies my invention. Fig. 2 is an enlarged detached perspective view of one end of one of the pickets, showing the wires connected thereto.

A represents the main wires of the fence and which may either be smooth or barbed, and B the pickets, which are made sufficiently long to connect two or more of the wires, as shown. These pickets are made of wood or other suitable material, and have formed in one of their sides two, three, or more grooves C, as may be desired, and in which the wires A are made to catch. If it is not desired to place the wires very closely together, but a single groove will be made in the inner side of each end of each picket; but if the wires are to be more closely placed, or intermediate wires are to be used, then three or more grooves will be made in the side of each picket, according to the number of wires that is to be used. In order to fasten the pickets in position upon the wires, so that they cannot be moved to one side by the animals, a short wire is wrapped a suitable number of times around each main wire just opposite each picket, and then the main wires and the short wires are hammered or forced into the grooves, and then the ends are bent around upon the opposite side of the picket and twisted tightly together. In forcing the main wire and the smaller wire into the groove the smaller wire is made to embed itself into the wood in such a manner as to lock the picket rigidly in position, so that it cannot be moved laterally by any ordinary pressure that may be applied to it.

If a truss-wire D is used, its central portion should be fastened to one or more of the upper sets of pickets, and may be fastened in the central grooves or cuts as the balance of the main wires are fastened. This truss-wire may be drawn down and fastened in the central grooves in the upper set of pickets for the purpose of giving tension to the truss and raising the fence, as desired, and this truss-wire will answer the purpose of an additional main wire to the fence. I preferably use all short pickets, which reach from one wire to the other, unless close spacing of the wires is necessary, and then three of the wires may be covered by the same picket, or, in extreme cases, four wires may be attached to the same picket; but I prefer to attach only two or three. If preferred, long pickets covering all the wires may be used or long and short pickets be interspersed.

A fence constructed as here shown and described is stronger and more ornamental than an ordinary wire fence, and the pickets serve to attract attention to the wires, so as to prevent the animals running against them and being injured.

Having thus described my invention, I claim—

In a wire fence, the posts, the main wires supported thereby, pickets which have transverse rectangular grooves, and small wires which are twisted around the said main wires and both placed in the said grooves, the width of the said grooves being slightly less than the diameter of the two wires, whereby the small wire is embedded in the walls of the said grooves and the ends of the small wires passed around the pickets and secured, the parts combined substantially as shown and described.

In testimony whereof I affix my signature in presence of two witnesses.

AARON F. DICKEY.

Witnesses:
JACOB D. SWANK,
J. H. BLACK.